Patented Feb. 27, 1951

2,543,562

UNITED STATES PATENT OFFICE 2,543,562

METHOD OF TREATING WATER

Edward R. Williams, Pittsburgh, Pa., assignor of one-half to Ella E. Williams, Pittsburgh, Pa.

No Drawing. Application October 24, 1947, Serial No. 782,035

2 Claims. (Cl. 210—23)

My invention comprises new and improved methods and compositions for the treatment of water.

It is among the objects of the invention to provide methods of treating water to prepare it for use as potable water suitable for municipal water supplies, for residential, institutional, commercial and industrial purposes and such other like purposes for which water may be required.

Another object of the invention is to provide new compositions of matter for the treatment of water as it flows in the lines, whereby the water may be softened and whereby rusty water conditions may be overcome and prevented in the lines and equipment for handling water, and rust barnacles and other deposits from the water may be prevented and overcome.

Another object of the invention is to provide treatment for swimming pool water whereby swimming pools may be maintained in a more sanitary condition and to provide other factors contributive to the health and safety of the bathers.

A further object of the invention is to provide treatment for water contributive to bacteria control whereby the use of chlorine may be materially reduce, the advantages of which will be further indicated herein.

Another object of the invention is to provide new compositions of matter for practicing the invention and its methods, which are cheap, readily prepared, highly efficient, safe to handle and use, unobjectionable in odor and which do not impart any odor or taste to the treated water, and which are adapted to manual and automatic application, and which may be produced in liquid and dry forms, thereby being contributive to advantages in handling, shipping and practicing the invention.

It is quite apparent that in the treatment of water for various purposes different reactions or results are desirable, it being obvious that water intended for use as potable water or for drinking purposes would be found objectionable if the same were treated to an extent necessary for laundering or other detergent purposes. Furthermore in the treatment of water for swimming pools, it is obvious that excessive suds or froth conditions of the water would be objectionable. However swimming pool waters require treatment to a greater degree than should obtain in treating water for potable or drinking purposes, in order to eliminate body-grease and act as a solvent for toiletries such as hair-oil, rouge, lipstick, leg make-up, etc. commonly used by the bathers, whereby coagulation thereof is prevented, and stickiness of the hair and bodies of the bathers is overcome. It is quite evident however that a lower sudsing action of the treatment should be maintained than necessary for use in the treatment of water intended for laundering or detergent purposes.

In Patent No. 2,306,147, issued to me on December 22, 1942, I disclosed and claimed the treatment of water for laundering, detergent and like purposes, and involving the use of compositions including sodium silicate and a hydrocarbon sulfonate product composed of about eighty-five percent (85%) hydrocarbon sulfonate and about fifteen percent (15%) sodium sulfate, said ratio of the two constituents of the hydrocarbon sulfonate product being found generally in commercially available hydrocarbon sulfonate products due to said percentages being advantageous for the purposes to which said products are generally put, such as wetting agents.

While I have found the use of such composition in the treatment of water for laundering or detergent purposes has proved highly successful, I have discovered that the patented composition is highly disadvantageous and quite objectionable in the treatment of water for certain other important purposes, such, as for instance, to render water potable for municipal water systems, for residential, institutional, commercial and industrial purposes, and for other employment wherein the water must be treated with chlorine or bromine for bacteria control, such as for use in swimming pools. These objectionable features are due to an excessive sudsy characteristic contributed to the patented composition by a higher percentage of sodium sulfate content of the hydrocarbon sulfonate product and are highly objectionable for the purposes for which my present invention is intended and wherein less sodium sulfate content of the hydrocarbon sulfonate product is employed, thus eliminating said objectionable features.

Thus, in the treatment of water to render it potable and suitable for municipal, residential, institutional, commercial and industrial operations, it is the general practice to maintain in the water a residual chlorine content within the range of from point three (.3) to point five (.5) part chlorine per million parts water, the same being considered indicative of suitable status for adequate bacteria control. However under some conditions the chlorine from a residual content may be increased to as high as from point seven (.7) to the unit one part (1.0) per million parts of water.

When the source of water supply for municipal purposes is found to be acid in reaction or on the acid side of neutral in the pH scale, it is the common practice to treat the water with an alkali, such as sodium carbonate, to neutralize the acidity or to render the water slightly alkaline, the purpose being, first, to improve its retentive action toward the chlorine content added thereto, and, second, to avoid corrosion of metal with which the water may come into contact.

In the case of swimming pools similar methods are followed, the water usually being maintained with an alkalinity ranging from 7.2 pH to 7.6 pH which is recognized as a suitable status for the retention of the desired residual chlorine content.

When such reagents as sodium carbonate are added to hard water or water contaminated with earth-metal salts, primarily calcium and magnesium, which are known to have hardening effect on the water, a reaction occurs which changes these bicarbonates from their soluble status in the water to their insoluble status as carbonates, whereby they are dissociated and become suspended in the water, causing the water to be cloudy, or if undisturbed they eventually are precipitated in the form of a finely divided floc which for most purposes is highly objectionable.

The removal of said floc from swimming pools, for example, is accomplished in some instances by a vacuum process which inevitably is accompanied by the removal of considerable water which has been treated with chlorine and sodium carbonate, thus requiring the addition of more water and the treatment thereof. Furthermore under present practices considerable of the light floc is thrown upward in a suspended status in the water, due to the disturbance thereof by the vacuum apparatus, thus rendering the removal of the floc incomplete.

Another method which is generally practiced for the removal of the light floc and other suspended, precipitated or otherwise carried dross, dust, soil, etc., is by circulation of the pool water through sand filter beds. In order to prevent the finely divided particles of the light floc, etc. from passing through the sand of the filter beds, it is the general practice to add alum to the water to form what is termed a "mat" upon the surface of the sand of the filter beds, which mat catches and retains the light floc and other light suspended or otherwise carried material of the water, while permitting the water to pass through the sand whereby other contaminatives are removed and the water clarified. The filter beds are backwashed from time to time according to requirement to remove the dross, floc and precipitates, and alum is again added to the water to restore the mat formation.

An objectionable condition encountered in swimming pools is the coagulation of body-grease and other oily and greasy contaminatives, such as hair-oil, leg make-up, lipstick, rouge and other cosmetics and toiletries in common use by bathers, which coagulation is caused by the alum-impregnated water which has passed through the alum type mat of the filter beds.

Another objectionable contamination encountered in swimming pools is algae or plant growth which is of a slimy character forming upon the floor and walls of the pool and permeating the entire body of water, and which is of a green color in outdoor pools due to the sun's rays and heat, and which sometimes turns green in the indoor pools, although the green color is not usually as pronounced in the indoor pools. In both cases slimy slippery conditions occur upon the walls and floor of the pools. Furthermore evidence of the algae's permeation of the water is found in the fact that rubber objects such as life buoys, floats, rubber balls and the like used by the bathers quickly become slippery from being used in the water. The algae renders the walls and floor of the pools unsanitary, slippery and dangerous, and the slimy coating imparted to the rubber objects is likewise objectionable.

In the present practice the reagent used for combating algae or plant growth is copper sulfate or compositions thereof, which reagents are objectionable because they are poisonous and react to turn blond hair of bathers and light colored bathing suits to a green shade. Furthermore being acid in reaction copper sulfate contributes hardness to the water and is corrosive toward water lines and metallic equipment.

Still another objection encountered in the maintainance of swimming pools is the irritation of the bathers' eyes, which is generally attributed to the caustic action of the quantity of chlorine found necessary in the present practice for adequate bacteria control and likewise the caustic action of the sodium carbonate necessary for the retention of said chlorine volumes.

As a substitute for chlorine in swimming pools, bromine is sometimes employed for bacteria control, the similarity of the two chemicals being obvious, both being derived from salt (sodium chloride) by similar methods or processes, those of electrolysis, both having irritating fumes and obnoxious odors, and both being poisonous and irritating to the flesh or caustic in nature, hence irritating to the bathers' eyes.

In view of the similarity in nature and sources and methods of production of the two chemicals or reagents (chlorine and bromine) it is obvious that similar reactions will obtain from the treatment of water with same. It is likewise apparent that, due to the close relation of these two reagents, a chemical reagent which reacts toward chlorine to accomplish certain advantages and results will in like manner accomplish similar reactions and results toward bromine, such as acting in a catalytic manner or increasing their solubility or diffusive action in water, and thus less volumes thereof will be required to maintain suitable residual content for bacteria control, and also in neutralizing the causticity thereof.

With respect to hydrocarbon sulfonate products, which are a part of the subject matter of the present invention, I have found that variations in the hydrocarbon fractions or derivatives used and the necessary variations in the processing thereof contribute to variations in the percentages of the two active constituents thereof, namely, hydrocarbon sulfonate and sodium sulfate.

Owing to the availability in the market of petroleum sulfonate products and their relative cheapness, they are particularly adapted for use in my new composition.

It is apparent that of necessity the hydrocarbon sulfonate products normally contain some sodium sulfate due to the necessary processing in the production of such sulfonate products. Obviously the ratio of percentages of the two constituents depends to some degree upon the sodium or alkaline agent used and the volume thereof necessary in said processing to neutralize the acidity contributed thereto by the sulfonating and/or sulfating agents of the processes to produce a finished product approximately neutral in the pH scale which is the desired status. Hence variations may occur in said ratio of the percentages of the two constituents as normally processed.

I have found that with some hydrocarbon fractions or derivatives and the necessary processing in the production of hydrocarbon sulfonate products therewith the neutralizing treatment may be accomplished whereby the percentage of sodium sulfate may be maintained as low as approximately one and a half percent (1½%) of the total solids which constitute the commercial or finished product, and the hydrocarbon sulfonate percentage thereof may approximate ninety-eight and a half percent (98½%) of said total solids.

I have also found that with other hydrocarbon fractions or derivatives and the processing necessary to produce the hydrocarbon sulfonate products therewith, the sodium sulfate content may approximate seven percent (7%) of the total solids as the normally maintained low point with the hydrocarbon sulfonate content approximately ninety-three percent (93%) of the total solids thereof.

I have likewise found that the petroleum or hydrocarbon sulfonate products commercially available which are generally referred to as having approximately eighty-five percent (85%) hydrocarbon sulfonate content and fifteen percent (15%) sodium sulfate content, may have a high point of sixteen percent (16%) and a minimum of fifteen percent (15%) sodium sulfate, with the hydrocarbon sulfonate approximately eighty-four percent (84%) to eighty-five percent (85%) of the total solids.

I have found that with some processes and hydrocarbon fractions or derivatives that the sodium sulfate content may be increased somewhat by treatment with a sulfating agent such as hydrochloric acid, and in some processing methods chlorosulfonic acid may be used for some reactions.

It is apparent however while the methods or processing and reagents used for sulfonating and/or sulfating, and likewise the hydrocarbon fractions or derivatives utilized may vary, regardless of what methods, reagents or hydrocarbon fractions or derivatives are utilized in the sulfonating and/or sulfating treatment of the processes, that due to the necessity of neutralizing the acidity contributed by said sulfonating and/or sulfating treatment of the processes, wherein an alkaline agent such as for illustration sodium hydroxide (caustic soda), or sodium carbonate (soda ash), is used, that the ratio of percentages of the two active constituents of the finished products, hydrocarbon sulfonate and sodium sulfate, depends to a considerable extent upon the volume of said neutralizing agents used.

I have discovered that in the treatment of water for municipal supplies wherein the water is to be used as potable water or for drinking purposes and for use in residential, institutional, commercial and industrial operations, that the sodium sulfate content of the hydrocarbon sulfonate product used in the treatment or in the composition of the invention, should be maintained relatively low whereby the treatment will be contributive to less suds characteristic in the treated water. Hence the sodium sulfate content of the hydrocarbon sulfonate product used should have an approximate range of from one and a half percent (1½%) to seven percent (7%) of the solids thereof, and therefore the approximate range of the hydrocarbon sulfonate content of said solids would run from ninety-eight and a half percent (98½%) to ninety-three percent (93%) thereof.

I have discovered that in the treatment of water for use in swimming pools, in order to accomplish the desired objectives, such as counteracting the effects of body-grease, rouge and other toiletries which contaminate the water, and furthermore to combat algae or plant growth, and to contribute reactions whereby adequate alkalinity for maintenance of suitable residual chlorine or bromine content of the water for proper bacteria control, without causing the water to become excessively sudsy or frothy in character as above explained, said objectives are attained by the use of a hydrocarbon sulfonate product wherein the sodium sulfate content is maintained within a range of from approximately seven percent (7%) up to approximately fourteen percent (14%).

In order to obtain the desired ratio of percentages of the two active constituents of the hydrocarbon sulfonate products whereby the sodium sulfate content may be maintained at any desirable point within the range of from approximately seven percent (7%) to approximately fourteen percent (14%) of the total solids thereof, it is apparent that such a product having a high percentage of sodium sulfate, such as for illustration one having fifteen percent (15%) or higher, may be compounded with such a product having a lower sodium sulfate content such as for illustration one having a sodium sulfate content of one and a half percent (1½%), or other percentages adapted to bring the hydrocarbon sulfonate product to the desired status relative to sodium sulfate content. It is apparent that similar methods may be used in order to obtain any desirable sodium sulfate content of the hydrocarbon sulfonate products for any status that may be necessary for purposes wherein a lower than seven percent (7%) sodium sulfate content may be advantageous.

The hydrocarbon sulfonate products used in practicing my present invention are those which are water soluble and may be obtained in an aqueous solution form which is the initial form thereof, containing the solids which constitute the active constituents of the products, or they may be obtained in dry form as the final form product thereof, the same being obtained by dehydrating or removing the moisture of the initial aqueous solution form.

It is therefore apparent that the compositions of the invention may be produced in the dry form by compounding an alkali such as the dry form sodium silicate with the dry form of the hydrocarbon sulfonate product composed of hydrocarbon sulfonate and sodium sulfate. The liquid forms of the composition of my invention may be produced by using the initial or aqueous solution form of the hydrocarbon sulfonate product containing the desired percentages of hydrocarbon sulfonate and sodium sulfate, and compounding therewith sodium silicate in its liquid, semi-liquid, or dry form, all of which forms are commercially available; or by dissolving the dry form of sodium silicate in water and compounding the same with the initial aqueous solution form of the hydrocarbon sulfonate product, or by dissolving the final dry form of the hydrocarbon sulfonate product in water to make an aqueous solution thereof and substituting the same for the initial aqueous solution form thereof, and compounding therewith the sodium silicate in either its dry form, liquid or semi-liquid forms, or by making an aqueous solution of the sodium silicate and compounding the same with the aqueous solution obtained by dissolving the dry form of the hydrocarbon sulfonate product, or by compounding the sodium silicate solution with the initial aqueous solution form of the hydrocarbon sulfonate product, or by dissolving the dry form hydrocarbon sulfonate product in an aqueous solution of sodium silicate.

I have discovered that when the petroleum or hydrocarbon sulfonate products are used to treat water wherein chrorine, bromine, sodium carbonate, copper sulfate and other reagents commonly used in water treatment are present, the hydrocarbon sulfonate products apparently function in a catalytic manner to accelerate the action of the other reagents and cause them to be more soluble and diffusible so that less volume of such reagents is required to effect the desired results. I have also discovered that the use of said hydrocarbon sulfonate products acts to repress the dissociation of the hardening contaminatives of the water, thus lessening the formation, suspension and precipitation of floc in swimming pools.

I have also found by experiment and use that waters treated with chlorine in either its gaseous, liquid or dry state, can be maintained with the same residual chlorine content as presently practiced which is considered adequate for bacteria control, such as ranging from point three (.3) to point five (.5) part per million parts water, or at higher values thereof as sometimes required, by the addition thereto of the hydrocarbon sulfonate products in conjunction with an alkali, such as for instance the addition of a composition of hydrocarbon sulfonate products and sodium silicate, or by the addition of the hydrocarbon sulfonate products to an alkaline water, or to a water treated with sodium silicate, whereby the amount of chlorine required to maintain the same residual chlorine content may be materially reduced. Furthermore considerably less sodium carbonate is required for the retention of the chlorine. This is evidenced by the reports on samples of water taken from swimming pools and tested by State and municipal laboratories whereby said samples have been pronounced "class A" water equal to potable water and suitable for drinking purposes.

As an illustration of the repressive action of the hydrocarbon sulfonate products toward dissociation of the hardening content of waters, such as the calcium and magnesium content thereof, I may cite the instance of a swimming pool where it had been necessary to vacuum the floc from the pool twice weekly, but after the water had been treated in accordance with my present invention it was only necessary to vacuum the pool once a week, the operator reporting that the floc was not thrown upwards into the water by the operation as had previously occurred, and that practically all of the floc was removed by the vacuuming operation.

The advantages due to the reduction in the amount of chlorine or bromine required to maintain the necessary residual content thereof for adequate bacteria control are obvious, inasmuch as the unpleasant taste and odor of the chlorine or bromine are eliminated or very materially reduced, and eye and skin irritations are prevented. The material reduction of the amount of sodium carbonate required affords like advantages.

Experiment with and practice of my present invention demonstrate that by its use the water may be maintained at the proper alkalinity to retain the chlorine or bromine addition necessary for adequate bacteria control, as proved by the instance of a large municipal swimming pool of one million two hundred thousand gallons of water capacity where the composition of my present invention has been in use for several months, and wherein the alkalinity of the water has been maintained adequately for the retention of the chlorine for bacteria control, as evidenced by State and municipal laboratory reports which pronounced the water class "A," there having been no addition of any sodium carbonate or other alkalinity-imparting reagent other than the composition of my present invention. This instance exemplifies other swimming pools wherein similar results have been attained without the use of any sodium carbonate and wherein the composition of my invention imparts adequate alkalinity for the proper retention of the chlorine for adequate bacteria control.

In many instances wherein the composition of my invention has been adopted in the treatment of swimming pools, it has been necessary to reduce the volume of chlorine previously required, in order to prevent the residual chlorine content from rising above the desired status, thus demonstrating that the proper residual content may be maintained with materially less chlorine or bromine required. The water thus treated has been pronounced by State and municipal laboratories as class "A" water on suitable for drinking purposes.

As an illustration I cite an indoor swimming pool where the chlorinator was set to feed the chlorine gas to maintain a point three (.3) chlorine residual value, and after adding a small amount of the composition of my present invention to the pool it was found that the comparator reading of the water showed the residual chlorine value had increased to point eight (.8) part per million parts water. The chlorinator was then reduced in its rate of feeding and, again, after the water had been well circulated, the comparator reading showed a chlorine residual value of point eight (.8) part per million parts water without any further addition of the composition of my invention, so that it became necessary to again reduce the rate of feeding of the chlorine gas, and under these conditions the bacteria count report made by the State health laboratory was class "A" water or suitable for drinking purposes.

In another case where a swimming pool had been using chlorine gas with the chlorinator set as was customarily required to maintain suitable residual chlorine values, after some of the composition of my present invention was added to the pool water and the water circulated, the attendant reported that the residual chlorine value had increased materially so that he reduced the rate of feeding thereof at least fifty percent (50%), and the following day the residual chlorine value was found adequate and the bacteria count reports received from the municipal health laboratory were class "A" water suitable for potable or drinking water.

In the case of another swimming pool where the dry form of chlorine imparting reagent or the calcium chloride type thereof was used, the same being made into an aqueous solution for feeding it to the pool water, it was found that by the use of my present invention the amount required to maintain the desired chlorine residual contact could be reduced safely by at least fifty percent (50%) and the bacteria count reports were found to conform to the requirements of the State health laboratory.

In the case of another swimming pool where the liquid form of chlorine or sodium hypochlorite solution was used, similar reactions occurred to those found where, the chlorine, in gaseous form or the dry form had been used, such as reductions of from fifty percent (50%) to sixty percent (60%) over previous requirements, due to the use of the composition of my invention, and the bacteria count reports of the State health laboratory were class "A" water.

In the case of another swimming pool where it was necessary to use two (2) gallons of sodium hypochlorite solution per day in order to maintain a point three (.3) part per million parts water, of residual chlorine, after the composition of my present invention was added to the pool the chlorine reading increased to the unit one (1.0) part per million parts water. The following day the chlorine solution was reduced to one and a half (1½) gallons, and a small amount of the composition of the present invention added to the water, and again the residual chlorine value stood at unit one (1.0) part chlorine per million parts water, so that it became necessary to again reduce the volume of sodium hypochlorite solution added to the pool.

From these records it is apparent that the residual chlorine increased two or three times the value obtained when none of the composition of the present invention was used; hence the volume of chlorine required was found to be considerably less when the treatment of my invention was in use.

I have further discovered that swimming pool waters may be treated with the composition of the present invention to maintain the required chlorine residual values with material reductions in the volumes of chlorine in use over the requirements when none of my composition was used. Samples of this pool water were then taken and promptly dechlorinated, and the bacteria counts were found adequate to meet the State health laboratory requirements, thus demonstrating that the status of the treated pool water was adequate to control bacteria such as may occur from the presence of the bathers in the water, and evidencing that the action of the chlorine is not impaired or slowed up by the reduction of the volume of chlorine used over presently practiced methods, thus affording ample protection against bacteria due to sputum or expectoration or other bacteria contributed by the bathers to the water.

I have discovered also that my present invention contributes a neutralizing action toward chlorine causticity in swimming pools, whereby higher chlorine residual content values, as sometimes required by municipal and/or State health authorities, may be maintained with safety relative to eye irritations. As an illustration thereof I cite a representative instance of an indoor swimming pool where the authorities required the chlorine residual to be maintained at not less than point six (.6) and preferably at point eight (.8) part per million parts water. Prior to the use of the composition of the invention in this pool, a bather could not swim more than ten (10) to fifteen (15) lengths of the pool without causing eye irritations, whereas with the composition of the invention in use in the pool and the chlorine residual maintained at higher values a bather could swim from thirty (30) to forty-five (45) lengths of the pool without experiencing any eye irritation, as proved by actual tests.

I have discovered further that similar neutralizing action toward the chlorine element of saltwater swimming pools, is obtained by the use of the composition of the invention whereby the caustic action of the salt-water chlorine content is neutralized and thus eye irritations are overcome. As an illustration I cite a natatorium wherein sea water is used, and wherein bathers have spent as much as two hours and made as much as a quarter of a mile continuous swimming without experiencing any eye irritation when the composition was used in the pool, whereas prior to the adoption of the composition of my present invention, they had always found the salt-water very irritating to their eyes.

I have also discovered that the compositions of my present invention have an algaecidal action which contributes an improved sanitary status of swimming pools. To illustrate this I cite a municipal outdoor pool of one million five hundred thousand (1,500,000) gallons of water capacity, where algae formation had always been excessive and troublesome for years. The pool had been in operation one month before the adoption of the composition of my present invention and algae had formed already over approximately one hundred (100) feet square upon the floor of the pool basin and was increasing rapidly. The pool was first charged with approximately six gallons of my improved composition, and thereafter approximately a half gallon thereof was added daily to the pool, the daily dosage approximating one part treatment in three million (3,000,000) parts water. When the pool was drained two months after starting the use of the composition of my present invention, it was found that the algae which had formed prior to the use of my new composition had been killed, leaving it with a brown color and dried-up in appearance without any green color or slippery or slimy condition which ordinarily would have been present, and no further formation of algae had occurred. The management reported that, whereas in previous years the workmen could scarcely stand up in the pool basin even with rubbers on their shoes when the pool basin was drained, the men could now walk anywhere over the pool floor without slipping and with no rubbers on. The following year they started to use the composition of my present invention the first day of the summer season and used it daily thereafter, and when the pool was drained after being in operation for three months, not a particle of algae was found anywhere therein. During the entire season the water was clear and free from any green cast, such as algae produces, and the bottom of the pool could be seen as far as the eye could reach. The reports of bacteria count or control by the bacteriologist, in accord with the State health laboratory requirements, showed class "A" water. The bacteriologist stated that the treatment had accomplished an exceptional job, and the management reported they had received many compliments on the status of the pool from their patrons.

It has been found that when the treatment of the invention has been adopted by a pool the status of the water is so improved that the bathers quickly observe the same and frequently comment thereon, usually mentioning the fact that they have no eye irritation and no stickiness of their hair and bodies after being in the pool, thus demonstrating the sanitary advantages contributed to the pools by treatment in accordance with my present invention.

The hydrocarbon sulfonate products used in practicing the invention are produced in the customary manner used to sulfonate and/or sulfate hydrocarbon fractions or derivatives, which processes together with the types of hydrocarbon fractions or derivatives adapted to the production of the same are common knowledge to those skilled in the art of sulfonating and sulfating hydrocarbon fractions or derivatives, and generally speaking consists of treating the fractions or derivatives with sulfonating and/or sulfating agents such as fuming sulfuric acid and/or in some methods also using acids such as hydrochloric acid, or with other methods chlorosulfonic acid may be used for certain reactions, as before indicated, and using sodium such as sodium hydroxide (caustic soda) or sodium carbonate (soda ash) as the neutralizing agent whereby the acidity of the finished products is repressed, it being usually the practice to try to have the finished products approximately neutral in the pH scale. When the sulfonating and sulfating processes, including the neutralizing thereof, are accomplished the resultant product is in an aqueous solution form which contains the solids or active constituents, namely, hydrocarbon sulfonate and sodium sulfate, and said total solids may be found to run from thirty percent (30%) to fifty percent (50%), with the moisture ranging from fifty percent (50%) to seventy percent (70%), and other ratio of percentages may be obtained, depending upon the processing.

The initial form or aqueous solution containing the two active constituents, hydrocarbon sulfonate and sodium sulfate, is dehydrated or the moisture removed therefrom and the active constituents are thus obtained in dry form and may be produced in powdered form, flake or granular form, or in other forms such as beadlike particles, depending upon the method of dehydration.

In the treatment of water for most purposes, such as water for use by municipalities for residential, institutional, commercial and industrial operations, it is a recognized fact by those versed in the art, that the water should be maintained slightly on the alkaline side of neutral in the pH scale. Furthermore when waters have been softened by the removal of the hardening contaminatives such as the calcium and magnesium content thereof, as for instance by zeolite sand methods, it becomes necessary to treat such waters with sodium type alkalis when they are to be used in steam boilers, in order to prevent the water from pitting and corroding the metal of the boilers, it being common knowledge that acid type waters and waters which are free of alkaline earth metal salts cause corrosion more quickly and to a greater degree than waters which are on the alkaline side of neutral in the pH scale.

In my experience in using the herein described hydrocarbon sulfonate products commercially available, I have found them to have a corrosive action toward iron or steel, etc., regardless of the fact that they are intended to be neutral in the pH scale. Evidence of this corrosive action is found in the fact that the initial aqueous solution and likewise such solutions made by dissolving the dry or finished forms thereof in water, must be shipped in wooden barrels, or if steel drums are used they must be coated inside with a protective material to prevent the products from corrosive action toward the metal of the drums and furthermore causing precipitants of iron from the metal containers, which action discolors the solutions turning them from their natural clear light shades to a rusty, red or mahogany shade which is highly objectionable.

In view of the foregoing facts, indicative of the corrosive action of the hydrocarbon sulfonate products on metals, it is apparent that such products of themselves are not suitable or adapted to treat water for use as municipal water supplies for residential, institutional, commercial or industrial operations, or for such other purposes as where the water is carried in water lines or used in metallic equipment wherein corrosion may be prevented. Moreover they are evidently incapable of imparting suitable alkalinity status to the water for the retention of chlorine or bromine added thereto, adequately for bacteria control, whether for use in municipal water supplies or for use in treating water for swimming pools.

However I have, by experiment and practicing the present invention in the treatment of water, discovered that said hydrocarbon sulfonate products such as have been described herein, when used in conjunction with an alkali such as sodium silicate, as by treatment of the water with a composition composed of said hydrocarbon sulfonate products and sodium silicate, or by the addition of said hydrocarbon sulfonate products to an alkaline water, or to water treated with sodium silicate, said methods will prove adequate for the retention of suitable residual chlorine or bromine content in the water for bacteria control, thus adapting the water to use as potable water or for drinking purposes, and likewise suitable for use in swimming pools, and that materially less chlorine or bromine will be required to maintain the water within the range indicative of proper bacteria control, and that the bacteria counts or control will be found adequate by analysis of State and municipal health laboratories.

To illustrate the rust preventive action of the compositions of the invention I have found that when the composition has been introduced into swimming pools where the water lines frequently had become rusty and contained rust barnacles and other deposits from the water, such conditions were overcome and prevented. Similar results have occurred where the composition of my present invention has been used to treat water, as it flows in water lines, by injecting the composition of the invention into the lines by means of suitable injecting apparatus connected to the lines. In such instances the lines were cleared of rust barnacles and other deposits and rusty water conditions were overcome and prevented. Also instances have occurred where the treatment has been used in hot water lines where small particles of scale have come from the hot water faucets, evidently having been removed from the heating coils.

While I have hereinbefore described and explained that the compositions of the invention may be produced in either dry or liquid forms, it is obvious that the liquid form thereof will be more quickly dispersed or diffused throughout a body of water, and for such reason is preferable for some purposes. However it is apparent also that the dry form of the composition would have advantages where shipments of long distance were to be taken into consideration, in view of saving in delivery costs and container costs.

For manufacturing purposes, I prefer the liquid form composition, because it eliminates dust and waste such as may occur in compounding the dry form compositions. In the manufacture of the liquid form of the compositions, the initial aqueous solution form of the hydrocarbon sulfonate product having the proper percentage of the two active constituents, hydrocarbon sulfonate and sodium sulfate, is compounded with the liquid or semi-liquid form of the sodium silicate in approximately the ratio of one part by weight of the aqueous solution to approximately two and a half parts by weight of the liquid or semi-liquid form of sodium silicate and water may be added to adjust the alkalinity imparting property of the composition and likewise to adjust the viscosity, and body, weight or gravity thereof.

It is apparent that where it is desired to produce the composition of the invention in the dry form thereof, that similar proportions of the constituents should be used to those indicated above where the liquid form of the composition of my present invention proportions have been stated, obviously taking into consideration the percentages of moisture of the aqueous solution of the hydrocarbon sulfonate product and likewise the moisture present in the liquid or semi-liquid form of the sodium silicate constituent thereof, both of which are available and within the common knowledge of those familiar with such chemicals.

With reference to the percentages of the two active constituents of the hydrocarbon sulfonate products which are a part of the subject matter of my present invention, and particularly with reference to the ratio of percentages of said constituents as stated in the appended claims hereof, wherein I have shown the range of the hydrocarbon sulfonate content thereof to be from a miminum of approximately eighty-six percent (86%) to a maximum of approximately ninety-eight and one-half percent (98½%) and the range of the sodium sulfate content thereof to be from a minimum of approximately one and one-half percent (1½%) to a maximum of approximately fourteen percent (14%) in the practice of my present invention, it is apparent that when the minimum percentage of the hydrocarbon sulfonate constituent exists in said products the maximum percentage of the sodium sulfate constituent must of necessity exist therein. And in like manner the reverse status obtains when the maximum percentage of the hydrocarbon sulfonate constituent exists in said products wherein of necessity the minimum percentage of the sodium sulfate constituent must exist therein. And it is further apparent that in any of said hydrocarbon sulfonate products as the percentage of one constituent increases the percentage of the other constituent must of necessity decrease. Thus it is apparent that any desired ratio of percentages of the two active constituents of the hydrocarbon sulfonate products within the stated ranges thereof may be utilized in practicing my invention.

I claim:

1. The method of treating water wherein a residual remains from the treatment thereof with a free halogen bactericide of the class consisting of chlorine and bromine to maintain a low bacteria count which comprises adding sodium silicate in sufficient quantities to impart alkalinity and a neutral petroleum sulfonate product composed of 86% to 98½% of petroleum sulfonate and 14% to 1½% of sodium sulfate.

2. The method of claim 1 wherein the percentages of the neutral petroleum sulfonate consists of 93% of petroleum sulfonate and 7% of sodium sulfate.

EDWARD R. WILLIAMS.

REFERENCES CITED

The following references are of record in the file of this patent:

UNITED STATES PATENTS

| Number | Name | Date |
| --- | --- | --- |
| 2,149,662 | Brandt | Mar. 7, 1939 |
| 2,306,147 | Williams | Dec. 22, 1942 |